(12) United States Patent
Hyltander et al.

(10) Patent No.: US 9,230,452 B2
(45) Date of Patent: Jan. 5, 2016

(54) DEVICE AND METHOD FOR GENERATING A VIRTUAL ANATOMIC ENVIRONMENT

(75) Inventors: Anders Hyltander, Askim (SE); Hans Lönroth, Kullavik (SE)

(73) Assignee: SURGICAL SCIENCE SWEDEN AB, Gothenburg (SE)

( * ) Notice: Subject to any disclaimer, the term of this patent is extended or adjusted under 35 U.S.C. 154(b) by 1310 days.

(21) Appl. No.: 10/529,496

(22) PCT Filed: Sep. 30, 2003

(86) PCT No.: PCT/SE03/01514
§ 371 (c)(1),
(2), (4) Date: Sep. 16, 2005

(87) PCT Pub. No.: WO2004/029910
PCT Pub. Date: Apr. 8, 2004

(65) Prior Publication Data
US 2006/0099557 A1    May 11, 2006

(30) Foreign Application Priority Data
Sep. 30, 2002   (SE) .................................... 0202864

(51) Int. Cl.
*G09B 23/28*    (2006.01)
(52) U.S. Cl.
CPC ....................... *G09B 23/28* (2013.01)
(58) Field of Classification Search
CPC .................................................. G09B 23/28
USPC ................ 434/262, 265–267, 272; 703/7, 11
See application file for complete search history.

(56) References Cited

U.S. PATENT DOCUMENTS

| 4,879,668 A | * | 11/1989 | Cline et al. ..................... 345/424 |
| 4,907,973 A | * | 3/1990 | Hon ............................. 434/262 |
| 4,984,157 A | * | 1/1991 | Cline et al. ..................... 345/424 |
| 5,273,038 A | * | 12/1993 | Beavin .......................... 600/416 |

(Continued)

FOREIGN PATENT DOCUMENTS

| JP | 11-219100 | 8/1999 |
| WO | WO 96/28800 | 9/1996 |

(Continued)

OTHER PUBLICATIONS

English translation of Office Action for Japanese patent application No. 2004-539722 dated Apr. 10, 2009.

(Continued)

*Primary Examiner* — Timothy Musselman
*Assistant Examiner* — Alvin Carlos
(74) *Attorney, Agent, or Firm* — Harness, Dickey & Pierce, P.L.C.

(57) ABSTRACT

This invention relates to a method for generating a virtual anatomic environment for use in minimally invasive surgery simulation, comprising the steps of: incorporating a main virtual anatomic environment (1); selecting a local anatomic environment (2) from a predefined library (3) comprising a set of two or more simulated local anatomic environments (2); including the selected local anatomic environment (2) in said main anatomic environment (1) to form a total virtual anatomic environment (4). The invention also relates to a device for generating a virtual anatomic environment for use in minimally invasive surgery simulation, as well as a computer-based minimal-invasive surgery simulation system comprising such a device.

19 Claims, 3 Drawing Sheets

(56) References Cited

U.S. PATENT DOCUMENTS

| | | | | |
|---|---|---|---|---|
| 5,385,474 | A * | 1/1995 | Brindle | 434/267 |
| 5,402,801 | A * | 4/1995 | Taylor | 128/898 |
| 5,403,191 | A * | 4/1995 | Tuason | 434/262 |
| 5,503,149 | A * | 4/1996 | Beavin | 600/411 |
| 5,609,485 | A * | 3/1997 | Bergman et al. | 434/262 |
| 5,625,577 | A * | 4/1997 | Kunii et al. | 703/2 |
| 5,755,577 | A * | 5/1998 | Gillio | 434/262 |
| 5,769,640 | A * | 6/1998 | Jacobus et al. | 434/262 |
| 5,771,181 | A * | 6/1998 | Moore et al. | 703/7 |
| 5,791,907 | A * | 8/1998 | Ramshaw et al. | 434/262 |
| 5,800,179 | A * | 9/1998 | Bailey | 434/262 |
| 5,853,292 | A * | 12/1998 | Eggert et al. | 434/262 |
| 5,873,732 | A * | 2/1999 | Hasson | 434/262 |
| 5,882,206 | A * | 3/1999 | Gillio | 434/262 |
| 5,947,743 | A * | 9/1999 | Hasson | 434/262 |
| 5,956,040 | A * | 9/1999 | Asano et al. | 345/419 |
| 6,024,695 | A * | 2/2000 | Taylor et al. | 600/102 |
| 6,062,865 | A * | 5/2000 | Bailey | 434/262 |
| 6,064,390 | A * | 5/2000 | Sagar et al. | 345/420 |
| 6,074,213 | A * | 6/2000 | Hon | 434/262 |
| 6,083,162 | A * | 7/2000 | Vining | 600/407 |
| 6,141,437 | A * | 10/2000 | Xu et al. | 382/130 |
| 6,151,404 | A * | 11/2000 | Pieper | 382/128 |
| 6,193,519 | B1 * | 2/2001 | Eggert et al. | 434/262 |
| 6,236,878 | B1 * | 5/2001 | Taylor et al. | 600/416 |
| 6,267,599 | B1 * | 7/2001 | Bailey | 434/262 |
| 6,310,619 | B1 * | 10/2001 | Rice | 345/420 |
| 6,331,116 | B1 * | 12/2001 | Kaufman et al. | 434/262 |
| 6,336,812 | B1 | 1/2002 | Cooper et al. | |
| 6,428,323 | B1 * | 8/2002 | Pugh | 434/274 |
| 6,503,087 | B1 * | 1/2003 | Eggert et al. | 434/262 |
| 6,544,041 | B1 * | 4/2003 | Damadian | 434/262 |
| 6,659,776 | B1 * | 12/2003 | Aumann et al. | 434/262 |
| 6,685,481 | B2 * | 2/2004 | Chamberlain | 434/272 |
| 6,692,258 | B1 * | 2/2004 | Kurzweil et al. | 434/262 |
| 6,714,901 | B1 * | 3/2004 | Cotin et al. | 703/7 |
| 6,747,672 | B1 * | 6/2004 | Haakonsen et al. | 715/700 |
| 6,827,580 | B1 * | 12/2004 | Chitty et al. | 434/267 |
| 6,857,878 | B1 * | 2/2005 | Chosack et al. | 434/267 |
| 6,939,138 | B2 * | 9/2005 | Chosack et al. | 434/262 |
| 6,952,806 | B1 * | 10/2005 | Card et al. | 715/802 |
| 7,236,618 | B1 * | 6/2007 | Chui et al. | 382/128 |
| 7,800,609 | B2 * | 9/2010 | Tarr et al. | 345/419 |
| 7,893,939 | B2 * | 2/2011 | Geiger et al. | 345/424 |
| 2001/0055748 | A1 * | 12/2001 | Bailey | 434/262 |
| 2002/0048743 | A1 * | 4/2002 | Schmieding et al. | 434/262 |
| 2004/0064298 | A1 * | 4/2004 | Levine | 703/11 |
| 2005/0033117 | A1 * | 2/2005 | Ozaki et al. | 600/109 |
| 2005/0084833 | A1 * | 4/2005 | Lacey et al. | 434/262 |
| 2006/0073454 | A1 * | 4/2006 | Hyltander et al. | 434/262 |

FOREIGN PATENT DOCUMENTS

| | | |
|---|---|---|
| WO | WO 98/58358 | 12/1998 |
| WO | WO 99/38141 | 7/1999 |
| WO | WO 01/78039 A2 | 10/2001 |

OTHER PUBLICATIONS

English translation of Japanese Office Action dated Mar. 5, 2010 for Japanese patent application No. 2004-539722.

Hiroshi Tanaka et al, "Trend of Medical VR and Virtual Surgery System," Image Labo, Japan Industrial Publishing Co., Ltd., Aug. 1, 202, vol. 13, No. 8, 152$^{nd}$ issue.

Hiroshi Tanaka et al, "Modular-structured Neurosurgical Simulator using Virtual Reality Technique," Transactions of the Virtual Reality Society of Japan, vol. 3, No. 4, Dec. 1998, pp. 229-235.

* cited by examiner

DEVICE AND METHOD FOR GENERATING A VIRTUAL ANATOMIC ENVIRONMENT

TECHNICAL FIELD OF THE INVENTION

This invention relates to a method for generating a virtual anatomic environment for use in minimally invasive surgery simulation. The invention further relates to such a computer-based minimal-invasive surgery simulation system.

BACKGROUND OF THE INVENTION

In modern surgery, minimal invasive techniques are used in more and more applications. The development of technology within this relatively new field advances quickly, which results in great training requirements for surgeons. One way of rendering the training more effective is to use computer simulations. Known techniques for providing a credible simulation are very complicated and expensive with respect to computer utility in the form of processor and memory. Moreover, the result is not sufficient to provide a realistic simulation environment. The visual properties that the anatomy exhibits in reality are difficult and time-consuming to recreate in a simulation.

By means of modern computer engineering, it is possible to provide realistic training situations in a virtual environment created by a computer program. In the computer program, a three-dimensional model of the object which the simulation concerns is provided. The user is provided with a projection thereof which should correspond to the picture information which in a real situation is caught by a camera. Within the field of laparoscopy, a camera is used to supply picture information from the patient to the surgeon. The display screen shows the picture that the camera catches of the inside of, for example, the abdominal cavity. All the instruments and the anatomy with which the surgeon works are reproduced by means of the camera and the display screen. The surgeon uses the information on the display screen to control and operate his or her instruments and carry out the procedures which are required to perform the surgical operation. Since the minimal invasive techniques supply information to the surgeon by means of a display screen, the three-dimensional reality is reduced to two dimensions on the display screen. The picture therefore lacks, among other things, the information as to depth that exists in reality. The surgeon has to make up for this loss of information by studying lighting conditions, colours, etc.

This means that all visual information, such as instrument and anatomy, is drawn by the computer. However, many complicated processes within the field of surgery are expensive, if not impossible, to fully simulate in a computer. For example, a large part of the picture information that the surgeon uses in real life, for example light effects and anatomic structures, factors such as breathing and beat of the pulse, which are present in the real situation are difficult to recreate realistically in the computer. Moreover, due to different biological anatomic variations occurring in humans, it is difficult to fully simulate a situation confronting a surgeon when he is to perform an operation. Some efforts have been made to generate simulation systems providing random variations of certain elements, such as the thickness of an artery, in order to provide a more realistic simulation environment. However, such random variations are not enough to fully prepare a surgeon on what to expect when performing minimal-invasive surgery. Moreover, the more alterations of this type that are made during simulation, during simulation, the more computer capacity is needed, making such systems expensive. Hence, a method for providing a more realistic simulation viding a more realistic simulation result, at the same time saving computer capacity, is desired, in order to provide a realistic, cost-efficient system for minimal-invasive surgery simulation.

SUMMARY OF THE INVENTION

Hence, an object of the present invention is to provide a method and system for use in minimally invasive surgery simulation system, in order to generate a realistic simulation environment, and which wholly or partly solve the above-mentioned problems.

These and other objects are at least partly achieved by a method for generating a virtual anatomic environment for use in minimally invasive surgery simulation, comprising the steps of: incorporating a main virtual anatomic environment, selecting a local anatomic environment from a predefined library comprising a set of two or more simulated local anatomic environments, and including the selected local anatomic environment in said main anatomic environment to form a total virtual anatomic environment. This enables a total virtual anatomic environment, in which simulation may be performed, to be built-up by separately modelled components. By using different building components, as stored in the library, different total virtual anatomic environments may be generated, without modelling the entire environment from the beginning. This also enables that the manufacturer may have a total control over what variations are stored in the library, and hence what total virtual anatomic environments that may be generated, as opposed to randomise alterations of separate components of the environment.

Preferably, said set of local anatomic environments is arranged to represent a set of anatomic variations for a critical internal area, occurring in living beings. Thereby, a straightforward method of achieving a simulation system, covering anatomic variations, such as different configurations of arteries and ducts around an organ, or different organ shapes (and so on) is realised.

Moreover, the step of selecting a local anatomic environment from a predefined library comprising two or more of simulated local anatomic environments suitably further comprises the step of randomly selecting one of the local anatomic environments in the library. Thereby, a user of the simulation system does not know in advance what anatomic environment will be presented to him. This provides a realistic situation for the user, and gives the user the opportunity to learn to tell the difference between different anatomic environments, that may look similar at a first glance. Preferably, the probability of randomly selecting a certain local anatomic environment essentially corresponds with the degree of occurrence of that local anatomic environment in living beings, in order to further provide a realistic simulation environment.

According to a preferred embodiment of the invention, the main virtual anatomic environment is arranged to model an internal cavity of a human, such as an abdominal cavity or a chest cavity, while the set of local anatomic environments is arranged to simulate different arrangements of arteries, veins and ducts around an organ arranged in said internal cavity, such as a gall bladder or a heart.

According to another embodiment, the inventive method further comprises the step of selecting, by means of user selection, a certain one of said local anatomic environments from said library and including it into said main virtual environment. This enables a user to practice surgery in a certain selected environment, for example to improve his or her skills on that certain environment, or to prepare for a real surgery of a patient exhibiting a similar environment.

The above and other objects are at least partly achieved by a device for generating a virtual anatomic environment for use in minimally invasive surgery simulation, comprising a modelling device for providing a main virtual anatomic environment, a library, comprising a set of two or more predefined local anatomic environments, and means for incorporating one of the local anatomic environments of the library into the main virtual anatomic environment, together forming a total virtual anatomic environment. Such a device enables a total virtual anatomic environment, in which simulation may be performed, to be built-up by separately modelled components. By using different building components, as stored in the library, different total virtual anatomic environments may be generated, without modelling the entire environment from the beginning. This also enables that the manufacturer may have a total control over what variations is stored in the library, and hence what total virtual anatomic environments that may be generated, as opposed to randomise alterations of separate components of the environment. This may be advantageous from an educational point of view.

Preferably, the device further comprises a selection device for selecting one of said local anatomic environments from said library to be included in said main anatomic environment, and suitably, the selection device is arranged to randomly select one of said local anatomic environments from said library to be included in said main anatomic environment. Thereby, a user of the simulation system does not know what anatomic environment will be presented to him. This provides a realistic situation for the user, and gives the user the opportunity to learn to tell the difference between different anatomic environments, that may look similar at a first glance. Preferably, the selection device is arranged to randomly select one of said local anatomic environments in such a way that the probability of choosing a certain local anatomic environment essentially corresponds with the degree of occurrence of that local anatomic environment in human beings, further improving the realism of the simulated surgery.

According to a preferred embodiment of the invention, the main virtual anatomic environment is arranged to model an internal cavity of a human, such as an abdominal cavity or a chest cavity, while the set of local anatomic environments is arranged to simulate different arrangements of arteries, veins and ducts around an organ arranged in said internal cavity, such as a gall bladder or a heart.

Also, the above and other objects of the invention are achieved by a computer-based minimal-invasive surgery simulation system, comprising a device for generating a virtual anatomic environment as described above.

BRIEF DESCRIPTION OF THE DRAWINGS

The invention will hereinafter be described in closer detail by means of presently preferred embodiments thereof, with reference to the accompanying drawings.

DESCRIPTION OF PREFERRED EMBODIMENTS OF THE INVENTION

Hereinafter, reference will be made in detail to a preferred embodiment of this invention, which is illustrated in the accompanying drawings.

Figure 1:
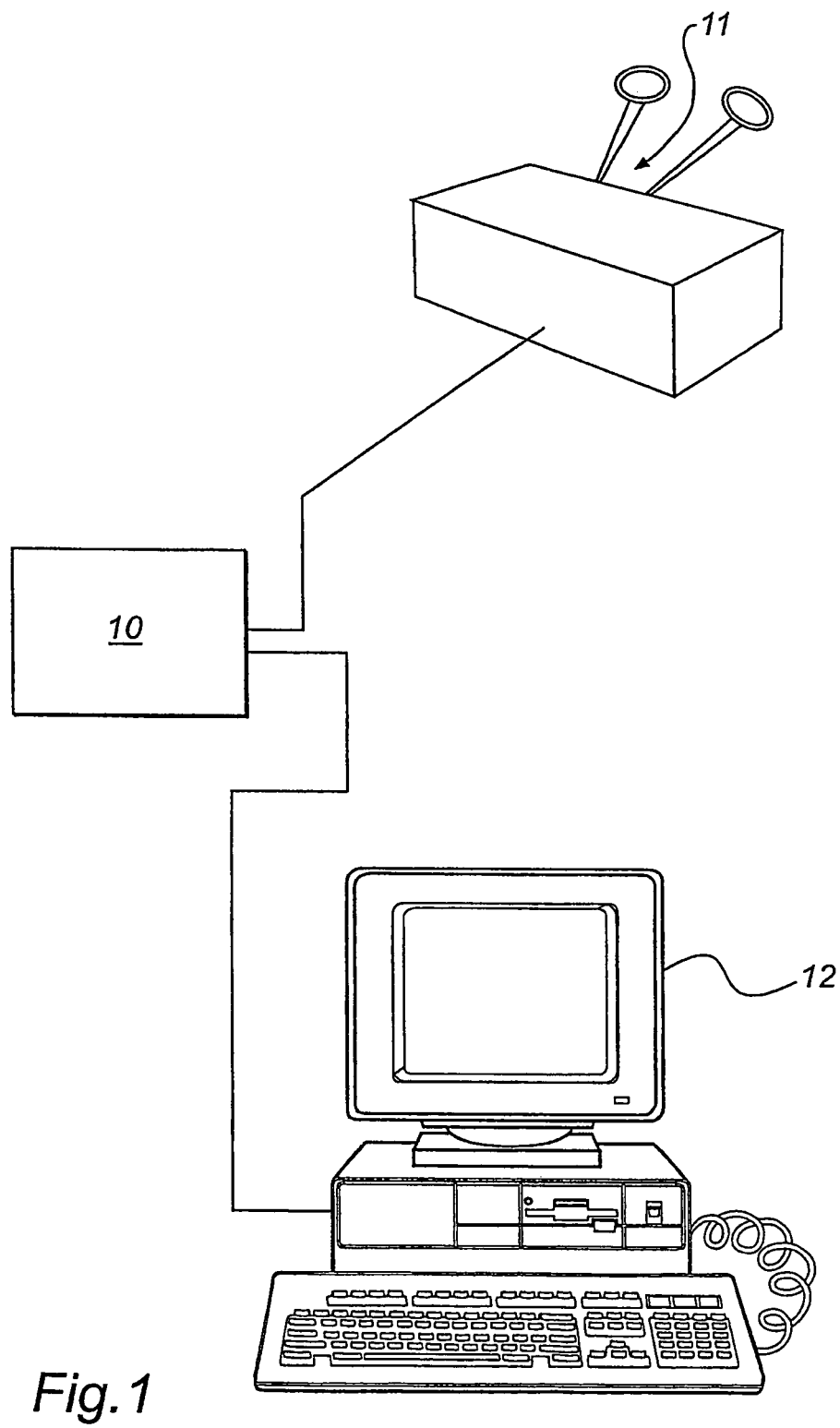
FIG. 1 is a schematic view of the basic components of a simulation system in which the present invention may be implemented.

As stated above this invention relates to the field of computer-based minimal-invasive surgery simulation systems, and a schematic drawing of the basic hard-ware components of such a system, in which the present invention may be incorporated, is disclosed in FIG. 1. Such a system essentially comprises a processing unit 10 for simulating a minimal-invasive surgery situation, a surgical tool input device 11, for inputting information regarding movements etc of a surgical tool to be manoeuvred by a user to the processing unit 10, and a display device 12 for displaying the simulated surgery procedure in order to visualise the simulated surgery situation for the user. The processing unit may, for example, comprise a personal computer which is preferably equipped with a graphics card having 3D-circuits. Moreover, the surgical tool input device 11 may or may not be provided with a system for tactile feedback to the user of the system.

Figure 2:
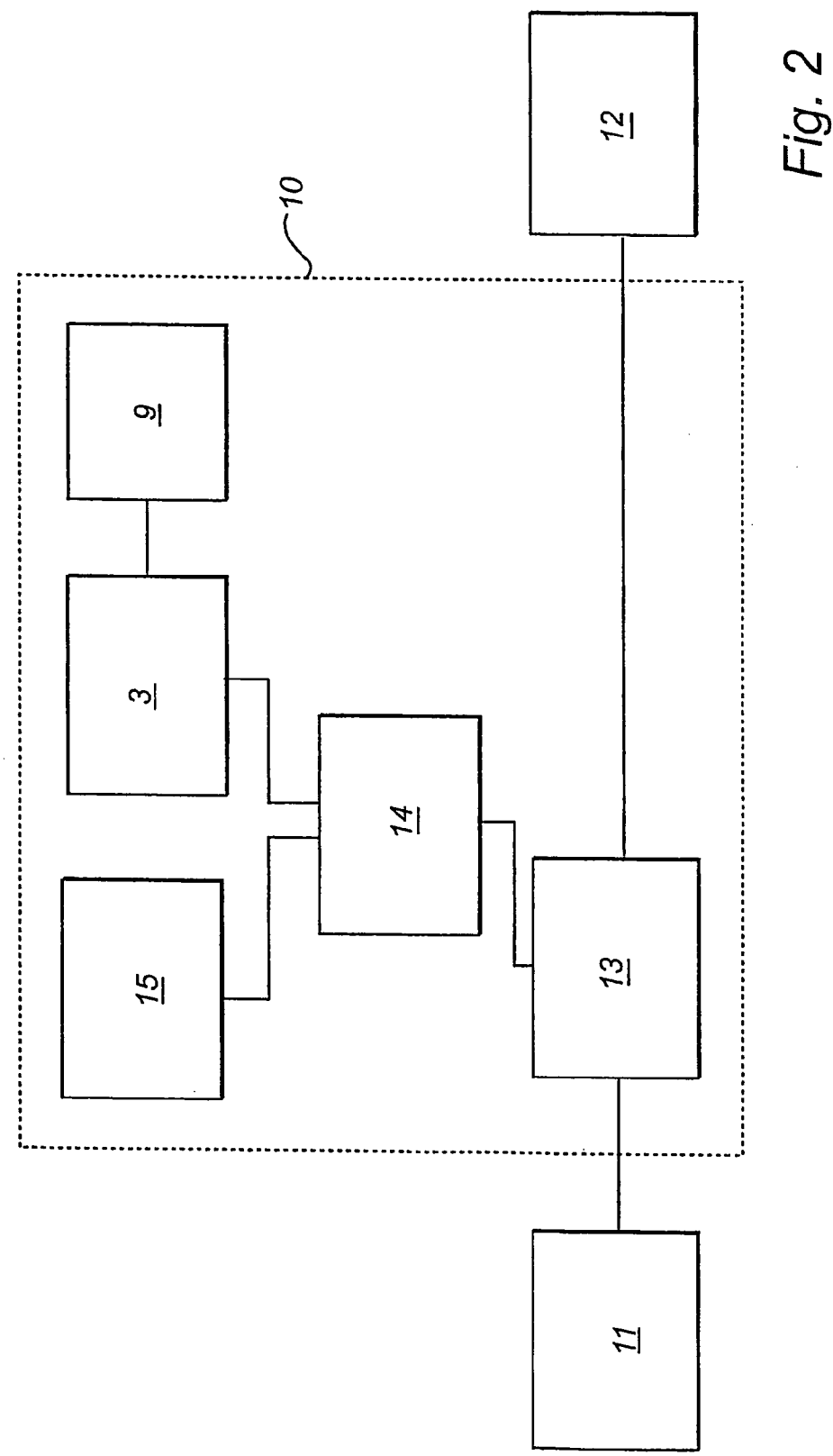
FIG. 2 is a block diagram of a simulation system according to an embodiment of the invention.

The processing unit 10, as disclosed in FIG. 1, will hereinafter be described in closer detail with reference to FIG. 2. The processing unit essentially comprises a total virtual anatomic environment modeller 14, for providing a model of a total virtual anatomic environment 2 to an interaction simulation device 13. The interaction simulation device 13 is also arranged to receive information regarding movements etc. of the surgical tool input device 11. Based on information from the total virtual anatomic environment modeller 14 and the surgical tool input device 11, the surgical procedure is simulated by said interaction simulation device 13, and the resulting simulation is outputted to the display device 12, whereby it is displayed for a user.

This invention is focused on the generation of the total virtual anatomic environment 4, generated by said total virtual anatomic environment modeller 14. According to the invention, the processing unit 10 further comprises a main virtual anatomic environment modeller 15, for providing a model of a main virtual anatomic environment 1, as well as a local anatomic environment library 3, for providing a model of a local virtual anatomic environment 2. The main virtual anatomic environment modeller 15 and the local anatomic environment library 3 are both connected with the total virtual anatomic environment modeller 14.

The main virtual anatomic environment modeller 15 is arranged to model and provide a model of a main virtual anatomic environment 1 to the total virtual anatomic environment modeller 14, while the local anatomic environment library 3 is arranged to store a two or more modelled local anatomic environments 2, and providing one of those to the total virtual anatomic environment modeller 14. Together, the main virtual anatomic environment 1 and the local anatomic environment 2 may form a total anatomic environment, in which simulation may be performed.

The term "local virtual anatomic environment" as used herein shall be understood as a 3-D model of a local internal area of a living being, that is critical during the surgery procedure that is to be simulated. For example, the local virtual anatomic environment may comprise a and organ 6, such as a gall bladder or a heart and the veins, arteries and ducts 7 surrounding the organ 6. However, the invention may be used for simulation of virtually any internal area, and hence, the invention is not limited to the above examples.

Figure 3:
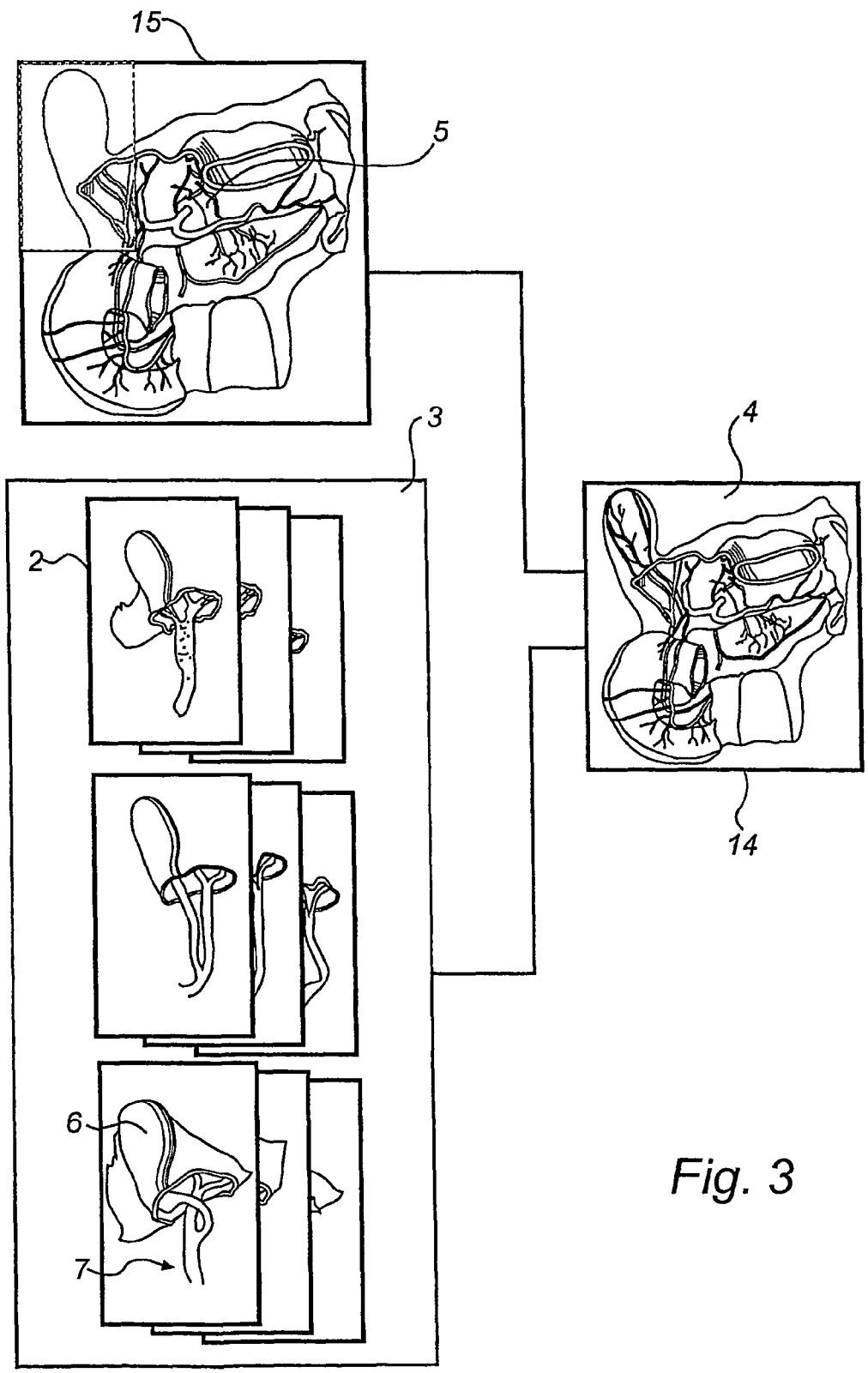
FIG. 3 is a block diagram describing the inventive device for generating a virtual anatomic environment for use in a minimally invasive surgery simulation system as shown in FIG. 1 or 2.

The term "local virtual anatomic environment library" as used herein shall be understood as a library containing two or more local virtual anatomic environments as defined above, said environments forming a set of environments. The set of environments may for example comprise a plurality of environments each modelling a biological variation in the selected local internal area. As an example, environmental models of different configurations of the veins, arteries and ducts surrounding the gall bladder, that are present in human beings may be stored in the library, as is disclosed in FIG. 3. In the present example, in order to cover the biological variety to an extent of approximately 99% of all humans, the set should contain about 16 different local virtual anatomic environments. Another example, for which the invention may be used, is different configurations of veins, arteries and ducts surrounding the heart.

The term "main virtual anatomic environment" as used herein shall be understood as a 3-D model of an internal area of a living being, essentially surrounding the local internal area described above. An example of such an internal area is the abdominal cavity (for the example with a gall bladder) or the chest cavity (for the example with the heart). The components included in the local virtual anatomic environment are excluded in the main virtual anatomic environment. For example, if the local virtual anatomic environment contains the gall bladder and the surrounding arteries and ducts, the main virtual anatomic environment does not include those components, but only connecting arteries, and ducts and so on. Alternatively, the local virtual anatomic environment may only comprise the arteries and ducts surrounding the gall bladder, while the gall bladder itself is included in the main virtual anatomic environment.

The device further comprises a selection device 9, for selecting one of the local anatomic environments 2 stored in the local anatomic environment library 3. This selection device may be realised in various different ways.

According to a first example, the selection device 9 may be provided with an input device (not shown), so that a user actively may select what local anatomic environment should be selected and included into the main virtual anatomic environment. This may for example be realised through a computer input interface, using a mouse or the like. The above enables training in a user-selected environment, for improving the user's skills regarding a certain biological variation, as defined by the selected local anatomic environment 2. Thereby, a user (surgeon) may train on a surgery procedure of a patient, exhibiting a certain biological variation, before performing the surgery. Moreover, the user may specifically train on procedures in local anatomic environments which they are less familiar with, thereby improving the overall quality of the surgery training.

According to a second example, the selection device 9 may be arranged as a random selection device, for randomly selecting one of the local anatomic environments 2, stored in the local anatomic environment library 3. This provides a realistic training situation, since, in most cases, a surgeon is not aware of what biological variation a patient exhibits until the surgery procedure has started. It is then of great importance to quickly be able to recognize the different biological variations, in order to perform a correct procedure. Hence, a selection device according to this example facilitates such training. In order to further enhance the realism of the surgical training, the selection device 9 may be arranged to randomly select one of the local anatomic environments 2, as described above, whereby the random selection is such that the probability of selecting a certain local anatomic environment essentially corresponds with the degree of occurrence of that local anatomic environment in human beings. This may for example be realised by means of providing each local anatomic environment 2 of the library 3 with a weight, corresponding to the occurrence of the biological variation being represented by the local anatomic environment 2 in question.

As stated above, the 3-D model of the main virtual anatomic environment 1 and the 3-D model of the selected local anatomic environment 2 is transmitted to the total virtual anatomic environment modeller 14, in which the local anatomic environment 2 is positioned in its desired position in the main virtual anatomic environment 1, together forming a total virtual anatomic environment.

The total anatomic environment, as modelled by the total anatomic environment modeller 14, is thereafter transmitted to the interaction simulation device 13, in which the total anatomic environment is used for performing the simulation, and the interaction with the inputted movements and actions of the surgical tool. Thereafter, the simulation result is transmitted to and displayed by the display device 12.

Many modifications, improvements and variations of the above described embodiments of the invention are obvious for the man skilled in the art, and such modifications, improvements and variations are intended to form a part of the disclosure, and are also intended to fall within the scope and spirit of this invention as defined by the appended claims. Hence, the above description of preferred embodiments is only given by way of example, and the invention is only to be limited to what is stated in the following claims, taking any equivalents into account.

For example, it shall be noted that the incorporation of the local virtual anatomic environment 2 into the main virtual anatomic environment may alternatively take place directly in the interaction simulation device 13, hence excluding the total virtual anatomic environment modeller 14 as a separate component.

The invention claimed is:

1. A method for producing a three-dimensional, computer generated virtual anatomic environment for use in a computer based visual simulation of minimally invasive surgery, comprising the steps of:
   providing a three-dimensional, computer generated main virtual anatomic environment,
   selecting a local anatomic environment from a predefined library comprising a set of two or more local anatomic environments, all of the local anatomic environments of the library being separately modelled three-dimensional, computer generated models each representing a distinct, individual anatomic variation in a local internal area of a living being,
   including the selected local anatomic environment in said main virtual anatomic environment to form said three-dimensional, computer generated virtual anatomic environment, the selection of different combinations of selected local anatomic environments in said main virtual anatomic environment thereby allowing generation of different virtual anatomic environments, each different virtual anatomic environment representing anatomic variations occurring in living beings,
   providing the virtual anatomical environment in an interaction simulation device, and
   performing the visual simulation in the interactive simulation device using the virtual anatomical environment.

2. A method according to claim 1, wherein the step of selecting a local anatomic environment from a predefined library comprising two or more of local anatomic environments further comprises the step of randomly selecting one of the local anatomic environments in the library.

3. A method according to claim 2, wherein the probability of randomly selecting a certain local anatomic environment essentially corresponds with the degree of occurrence of that local anatomic environment in living beings.

4. A method according to claim 1, wherein the main virtual anatomic environment is arranged to model an internal cavity of a human while the set of local anatomic environments is arranged to simulate different arrangements of arteries, veins and ducts around an organ arranged in said internal cavity.

5. A device for producing a three-dimensional, computer generated virtual anatomic environment for use in a computer based visual simulation of minimally invasive surgery, comprising:
a modelling device for providing a three-dimensional, computer generated main virtual anatomic environment,
a library, comprising a set of two or more local anatomic environments, all of the local anatomic environments of the library being separately modelled three-dimensional, computer generated models each representing a distinct, individual anatomic variation in a local internal area of a living being,
means for incorporating one of the local anatomic environments of the library into the main virtual anatomic environment, together forming said three-dimensional, computer generated virtual anatomic environment,
thereby allowing generation of different virtual anatomic environments, each different virtual anatomic environment representing anatomic variations occurring in living beings,
an interactive simulation device configured to perform the visual simulation by displaying the virtual anatomic environment.

6. A device according to claim 5, further comprising a selection device for selecting one of said local anatomic environments from said library to be included in said virtual anatomic environment.

7. A device according to claim 6, wherein the selection device is arranged to randomly select one of said local anatomic environments from said library to be included in said virtual anatomic environment.

8. A device according to claim 7, wherein the selection device is arranged to randomly select one of said local anatomic environments in such a way that the probability of selecting a certain local anatomic environment essentially corresponds with the degree of occurrence of that local anatomic environment in human beings.

9. A device according to claim 5, wherein the main virtual anatomic environment is arranged to model an internal cavity of a human while the set of local anatomic environments is arranged to simulate different arrangements of arteries, veins and ducts around an organ arranged in said internal cavity.

10. A computer-based minimal-invasive surgery simulation system, comprising a device for generating a virtual anatomic environment as described in claim 5.

11. A method according to claim 1, further comprising the step of selecting, by user selection, a certain one of said local anatomic environments from said library and including the selected local anatomic environments into said virtual anatomic environment.

12. A method according to claim 4, further comprising the step of selecting, by user selection, a certain one of said local anatomic environments from said library and including the selected local anatomic environments into said virtual anatomic environment.

13. A device according to claim 6, wherein the main virtual anatomic environment is arranged to model an internal cavity of a human while the set of local anatomic environments is arranged to simulate different arrangements of arteries, veins and ducts around an organ arranged in said internal cavity.

14. A device according to claim 7, wherein the main virtual anatomic environment is arranged to model an internal cavity of a human while the set of local anatomic environments is arranged to simulate different arrangements of arteries, veins and ducts around an organ arranged in said internal cavity.

15. A device according to claim 8, wherein the main virtual anatomic environment is arranged to model an internal cavity of a human while the set of local anatomic environments is arranged to simulate different arrangements of arteries, veins and ducts around an organ arranged in said internal cavity.

16. A computer-based minimal-invasive surgery simulation system, comprising a device for generating a virtual anatomic environment as described in claim 6.

17. A computer-based minimal-invasive surgery simulation system, comprising a device for generating a virtual anatomic environment as described in claim 7.

18. A method according to claim 1, wherein components included in the local anatomic environment are excluded in the main virtual anatomic environment.

19. A device according to claim 5, wherein components included in the local anatomic environments are excluded in the main virtual anatomic environment.

* * * * *